United States Patent
Päri

(10) Patent No.: US 12,218,418 B2
(45) Date of Patent: Feb. 4, 2025

(54) ENCLOSURE FOR AN ANTENNA ARRANGEMENT, AND A METHOD OF MANUFACTURING AN ENCLOSURE FOR AN ANTENNA ARRANGEMENT

(71) Applicant: NOKIA SOLUTIONS AND NETWORKS OY, Espoo (FI)

(72) Inventor: Mika Petri Päri, Tupos (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 656 days.

(21) Appl. No.: 16/723,898

(22) Filed: Dec. 20, 2019

(65) Prior Publication Data

US 2020/0203819 A1 Jun. 25, 2020

(30) Foreign Application Priority Data

Dec. 21, 2018 (EP) ..................................... 18214999

(51) Int. Cl.
*H01Q 1/42* (2006.01)
*B29C 45/14* (2006.01)
*B29L 31/34* (2006.01)

(52) U.S. Cl.
CPC ....... *H01Q 1/424* (2013.01); *B29C 45/14639* (2013.01); *B29L 2031/3456* (2013.01)

(58) Field of Classification Search
CPC .............. H01Q 1/424; B29C 45/14639; B29C 45/14795; B29C 44/1276; B29C 44/1285; B29L 2031/3456; Y10T 428/249953; Y10T 428/249983; B32B 5/18
See application file for complete search history.

(56) References Cited

U.S. PATENT DOCUMENTS

| | | | |
|---|---|---|---|
| 2,835,927 A * | 5/1958 | Henning | B29C 44/322 264/45.9 |
| 5,662,293 A | 9/1997 | Hower et al. | |
| 9,979,078 B2 * | 5/2018 | Koskiniemi | H01Q 1/42 |
| 10,166,707 B2 | 1/2019 | Chang et al. | |
| 2009/0020328 A1 * | 1/2009 | Sullivan | H05K 3/185 174/268 |
| 2009/0084432 A1 * | 4/2009 | Kosmehl | H01L 31/048 136/251 |

(Continued)

FOREIGN PATENT DOCUMENTS

| | | | | |
|---|---|---|---|---|
| DE | 102011076501 A1 * | 11/2012 | | H01Q 1/02 |
| JP | 2002192544 A * | 7/2002 | | |
| WO | WO 2018/052392 A1 | 3/2018 | | |

OTHER PUBLICATIONS

Density of Plastics Material: Technical Properties Table. Omnexus. (May 8, 2017). Retrieved Mar. 14, 2022, from https://web.archive.org/web/20170508142230/http://omnexus.specialchem.com:80/polymer-properties/properties/density (Year: 2017).*

(Continued)

*Primary Examiner* — Dameon E Levi
*Assistant Examiner* — Anh N Ho
(74) *Attorney, Agent, or Firm* — ALSTON & BIRD LLP

(57) ABSTRACT

An apparatus comprising an enclosure for an antenna arrangement including physically integrated parts including a first part of relatively dense, injection moldable plastic and a second part of less dense, injection moldable plastic. The first part and the second part are contiguous.

19 Claims, 3 Drawing Sheets

(56) References Cited

U.S. PATENT DOCUMENTS

| | | | |
|---|---|---|---|
| 2009/0218725 A1* | 9/2009 | Thelemann | B29C 45/16 |
| | | | 264/251 |
| 2011/0316759 A1* | 12/2011 | Fan | H01Q 1/42 |
| | | | 343/873 |
| 2013/0321237 A1* | 12/2013 | Woodhull | H05K 5/0217 |
| | | | 156/60 |
| 2014/0332248 A1* | 11/2014 | Stahl | B29C 65/562 |
| | | | 156/245 |
| 2015/0116184 A1 | 4/2015 | Curran et al. | |
| 2016/0079663 A1* | 3/2016 | Youm | H01Q 1/243 |
| | | | 343/702 |
| 2016/0351996 A1* | 12/2016 | Ou | H01Q 1/243 |
| 2017/0008251 A1 | 1/2017 | Pruett et al. | |
| 2017/0264009 A1* | 9/2017 | Worthen | B32B 27/12 |
| 2018/0159207 A1* | 6/2018 | Shurish | H01Q 1/421 |
| 2018/0241119 A1 | 8/2018 | Hawthorne | |

OTHER PUBLICATIONS

Nofar, M., & Park, C. B. (2018). Introduction to Plastic Foams and Their Foaming. Foamed Plastics—an overview | Science Direct Topics, p. 3. Retrieved Apr. 13, 2022, from https://www.sciencedirect.com/ (Year: 2018).*

Lasenfest, K., *Materials for Antenna Design: New Possibilities Enable Rugged, Cost-Effective Designs* [online] [retrieved Feb. 19, 2020]. Retrieved via the Internet: https://www.militaryaerospace.com/na/te-connectivity/materials-for-antenna-design.html (Mar. 31, 2016) 12 pages.

Extended European Search Report for Application No. 18 21 4999 dated Jun. 19, 2019, 8 pages.

* cited by examiner

ENCLOSURE FOR AN ANTENNA ARRANGEMENT, AND A METHOD OF MANUFACTURING AN ENCLOSURE FOR AN ANTENNA ARRANGEMENT

CROSS-REFERENCE TO RELATED APPLICATIONS

This application claims priority to European Application No. 18214999.7, filed Dec. 21, 2018, the entire contents of which are incorporated herein by reference.

TECHNOLOGICAL FIELD

Embodiments of the present disclosure relate to an enclosure for an antenna arrangement and a method of manufacturing an enclosure for an antenna arrangement.

BACKGROUND

Antenna arrangements are used in very many different applications for the transmission and/or reception of electromagnetic radiation. Often antenna arrangements comprise components that are vulnerable to damage either by physical contact or by exposure to the environment or the weather. An enclosure, also called a radome in some applications, can be used to protect the antenna arrangement.

For example, one application of an antenna arrangement is a part of a base transceiver station of a cellular communications network. Such base stations are often outside and it is necessary to protect the antenna arrangement from the weather. The antenna arrangement may be disposed in a base station unit or communications equipment, and or disposed in its own enclosure, separate from but electrically coupled to a base station unit or communications equipment.

It is desirable for an enclosure to be robust so that it is enduring but it must also avoid compromising the radio frequency (RF) performance, for example the overall radiation efficiency, of the antenna arrangement.

BRIEF SUMMARY

According to various, but not necessarily all, embodiments there is provided an apparatus comprising an enclosure for an antenna arrangement comprising physically integrated parts including:
a first part of first injection moldable plastic;
a second part of second injection moldable plastic, wherein the first injection moldable plastic is more dense than the second injection moldable plastic and wherein the first part and the second part are contiguous.

In some but not necessarily all examples, the enclosure comprises one or more artefacts of multi-shot injection molding including one or more of: a molding line, a fill hole, an ejector pin marking. In some but not necessarily all examples, the first part and the second part are a physically integrated combination and are directly interconnected without adhesive.

In some but not necessarily all examples, the second part is a lower density cellular structure. In some but not necessarily all examples, the lower density cellular structure comprises more gas than plastic by volume.

In some but not necessarily all examples, the second part has a lower dielectric permittivity and a lower dielectric loss compared to the first part.

In some but not necessarily all examples, the second part is formed from a polymer comprising gas and/or blowing agent.

In some but not necessarily all examples, the first part is rigid and configured to attach the enclosure to another object.

In some but not necessarily all examples, the first part defines a skeleton having one or more voids and wherein the second part infills the at least some of the one or more voids of the skeleton.

In some but not necessarily all examples, the enclosure further comprises a silicone rubber gasket.

According to various, but not necessarily all, embodiments there is provided a system comprising an enclosure as claimed in any preceding claim and an antenna arrangement comprising one or more antenna radiators adjacent to the second part of the enclosure but not adjacent to the first part.

According to various, but not necessarily all, embodiments there is provided a method for manufacturing an enclosure for an antenna arrangement comprising multi-shot injection molding, wherein one shot creates a first part of first injection molded plastic, wherein another shot creates a second part of second injection molded plastic, wherein the first injection molded plastic is more dense than the second injection molded plastic and wherein the first part and the second part are contiguous.

In some but not necessarily all examples, the another shot injects a polymer comprising gas and/or blowing agent to create, as the second part, a lower density cellular structure that comprises more gas than plastic by volume.

In some but not necessarily all examples, both the one shot and the another shot are injected into a mold comprising a first portion and a second portion, wherein the first portion of the mold defines one or more volumes configured to receive the first shot and form the first part, and wherein the second portion of the mold and the first part defines one or more volumes configured to receive the second shot and form the second part.

In some but not necessarily all examples, a third shot creates a third part of silicone rubber and/or a further part of plateable plastic for forming a conductive portion.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

Figure 1:
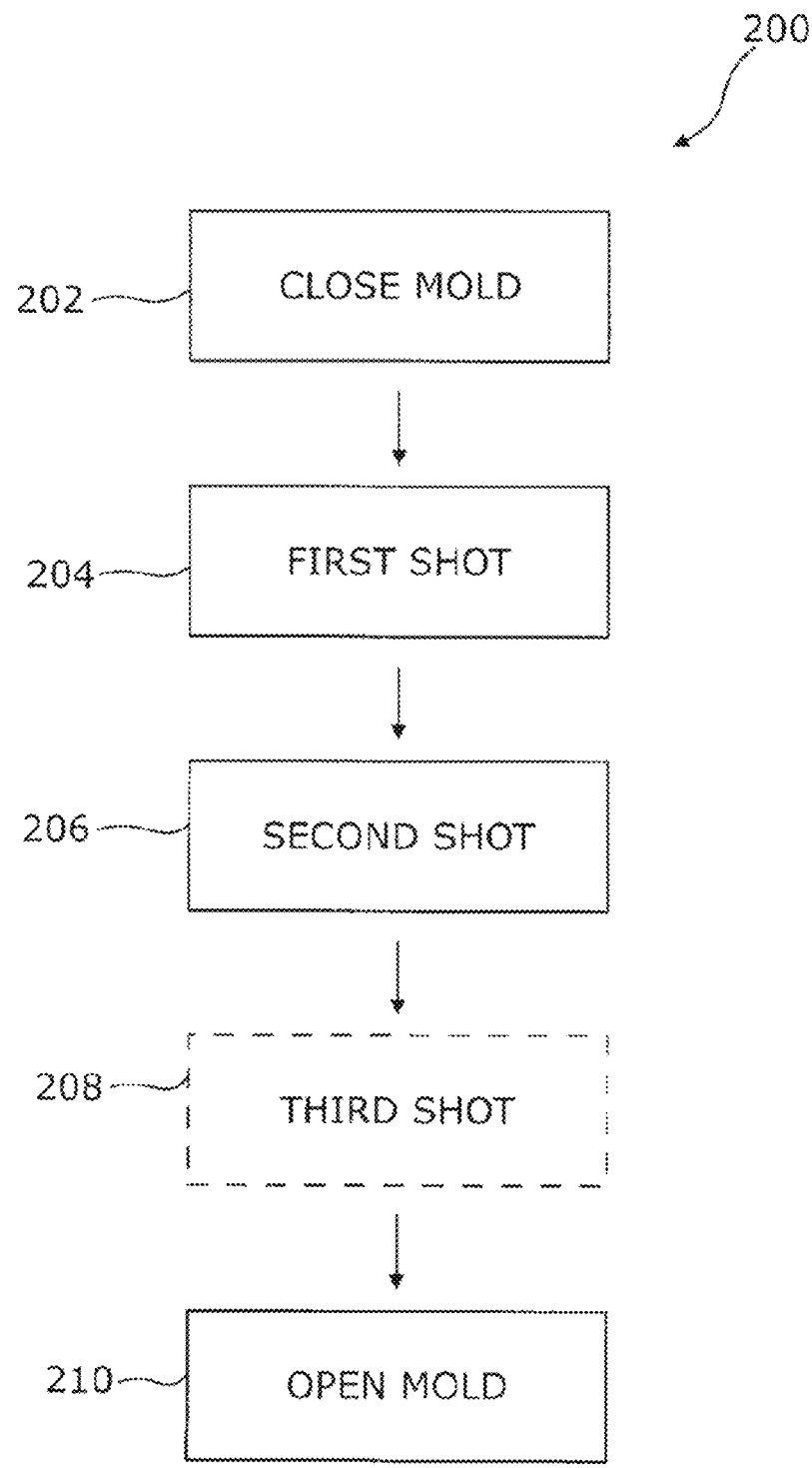
FIG. 1 shows an example embodiment of the subject matter described herein.

FIG. 1 illustrates an example of a method 200 for manufacturing an enclosure 10 for an antenna arrangement 60. The method 200 comprises multi-shot injection molding. Multiple different shots of material are injected into a mold during a single molding cycle. The molding cycle is the time from closing the mold, at block 202, to opening the mold, at block 210, to obtain the manufactured enclosure 10.

Examples of enclosures 10 that can be created by the method 200 are illustrated in FIGS. 2A & 2B, FIG. 3 and FIG. 4.

After closing the mold at block 202, at block 204 a first shot of molten plastic is injected into a mold cavity formed by the closed mold. Thus, a first portion of the closed mold defines one or more contoured volumes configured to receive the first shot and form the first part 20. During a subsequent cooling period, the first shot of molten plastic solidifies on at least part of a contour of the closed mold to form a first part 20 of the enclosure 10.

At block 206, a second shot of molten plastic is injected into an interim cavity formed by the first part 20 within the closed mold and the remaining, unfilled original mold cavity. Thus, a second portion of the closed mold and the first part 20 define one or more contoured volumes configured to receive the second shot and form the second part 30. During a subsequent cooling period, the second shot of molten plastic solidifies on at least part of a contour formed by the closed mold and/or first part 20 to form a second part 30.

At block 208, which is optional, a third shot of molten plastic is injected into a cavity formed by first part 20 and second part 30 within the closed mold and the remaining, unfilled original mold cavity. During a subsequent cooling period, the third shot of molten plastic solidifies on at least part of a contour formed by the mold, and the first part 20 and/or second part 30, to form a third part 50.

The first part 20 and the second part 30 are contiguous. The third part 50, if present, is contiguous to the first part 20 and/or the second part 30.

At block 210, the mold is opened and the enclosure 10 is de-molded. When de-molding, ejector pins within the mold may be used to apply pressure to the formed enclosure 10 to remove it from the mold.

The mold will typically have two components—an injection mold and an ejector mold and in combination they create one or more cavities. There is a sprue or gate in the mold for injection. The interface between the two components of the mold can create a mold line as an artefact 40 in the manufactured enclosure 10 and a sprue or gate can create a fill hole as an artefact 40 in the manufactured enclosure. When de-molding, the ejector pins can create ejector pin markings as an artefact 40 of the manufacturing process. Consequently, the enclosure 10, in some examples, comprises one or more artefacts 40 of multi-shot injection molding including one or more of: a molding line, a fill hole, an ejector pin marking.

The injection molding apparatus used for the multi-shot injection molding has one or more heated containers for the different injected material. Each container may have a mixer for mixing. An injector injects molten material (a shot) from a container into the mold. The injection is controlled to have a desired velocity-pressure profile.

One of the shots, for example the first occurring shot, creates relatively dense, injection molded plastic. Another of the shots, for example the second occurring shot, creates relatively less dense, injection molded plastic. In some but not necessarily all examples, the first part 20 is formed from relatively dense, injection molded plastic and the second part 30 is formed from relatively less dense, injection molded plastic.

In this example, the shot that creates the second part 30 creates a cellular structure in the injection material, which hardens. The material can be a liquid polymer comprising gas and/or blowing agent. The cellular structure can be achieved by:

whisking in a gas (e.g. nitrogen) or volatile liquid to the material before injection; and/or use a blowing agent (a pneumatogen). In some examples, the second part 30 comprises more gas than plastic by volume.

The third shot, if used, can be used to create a third part 50. This can be silicone rubber.

Figures 2A, 2B:
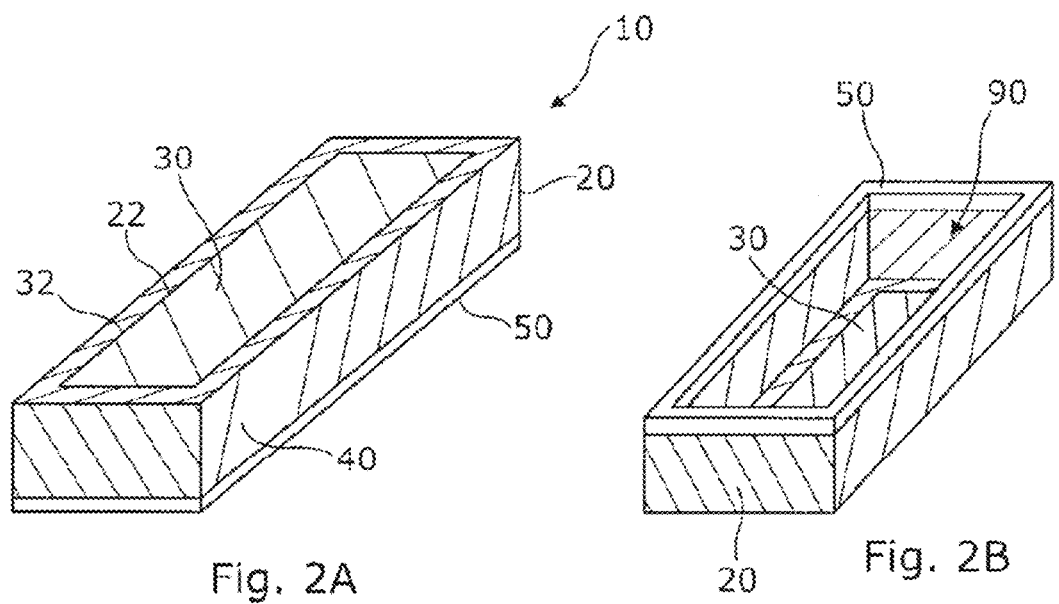
FIGS. 2A and 2B show another example embodiment of the subject matter described herein.
Figure 3:
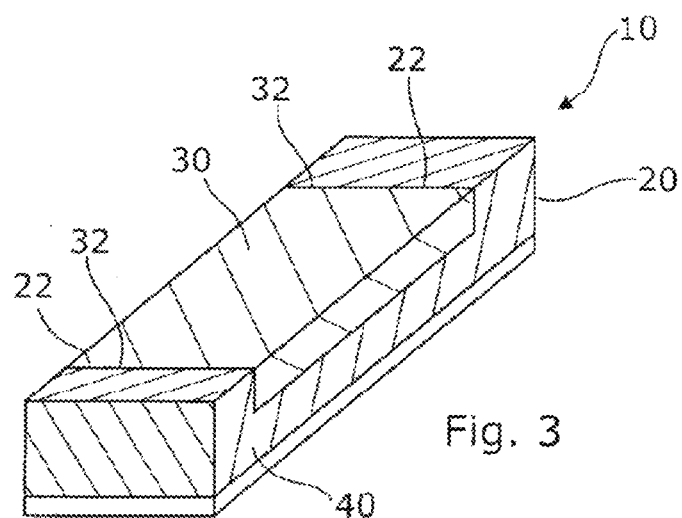
FIG. 3 shows another example embodiment of the subject matter described herein.

FIGS. 2A, 2B illustrate an example of an enclosure 10 formed by the method 200. FIG. 2A is a top-perspective view of an exterior of the enclosure 10. FIG. 2B is a bottom-perspective view of a cavity 90 of the enclosure 10. The cavity 90 is sized to receive an antenna arrangement 60 (see FIG. 4). FIG. 3 illustrates another example of an enclosure 10 formed by the method 200. FIG. 3 is a top-perspective view of an exterior of the enclosure 10.

The enclosure 10 for an antenna arrangement 60 comprises physically integrated parts including: a first part 20 of relatively dense, injection moldable plastic; and a second part 30 of less dense, injection moldable plastic.

An injection moldable plastic is a formed plastic that in a pre-formed state can be used for injection molding.

The first part 20 and the second part 30 are contiguous. In the examples illustrated the first part 20 has a perimeter 22 and the second part 30 has a perimeter 32. At least some of the perimeter 22 and the perimeter 32 are in direct contact. The first part 20 and the second part 30 are a physically integrated combination and are directly interconnected without adhesive.

The second part 30 is a cellular structure. The cellular structure can be elastomeric—a foam. In some examples, the second part 30 comprises more gas than plastic by volume. It may, for example, comprise 30% plastic and 70% gas bubbles by volume.

In some but not necessarily all examples, the second part 30 is formed from a polymer comprising gas and/or blowing agent. The polymer can, for example be a polyolefin elastomer such as polyethylene or polypropylene or can be ethylene-vinyl acetate (EVA). SPS (Syndiotactic Polystyrene) of various types, LCP (Liquid Crystal Polymer) 30% glass filled, and polycarbonate (PC)/Acrylonitrile Butadiene Styrene (ABS) may also be possible.

In some but not necessarily all examples, the second part 30 is virtually transparent to transmitted/received electromagnetic radiation so that the overall radiation efficiency of an antenna arrangement housed within the cavity 90 is not compromised by the enclosure.

The first part 20 is rigid and configured to attach the enclosure 10 to another object. In some examples the first part 20 is formed from polycarbonate.

The second part 30 has a lower dielectric permittivity and a lower dielectric loss compared to the first part 20. The second part 30 is more transparent than the first part 20 to electromagnetic radiation at the operational bandwidth(s) used by antenna arrangements 60 for housing within the cavity 90 of the enclosure 10.

In at least some examples, the first part 20 is mechanically stronger, for example has a higher Youngs Modulus, than the second part 30.

The first part 20 defines a skeleton (a frame) having one or more voids. The second part 30 infills at least some of the one or more voids of the skeleton.

In some examples, the physically integrated parts of the enclosure 10 include a third part 50 of silicone rubber. In the examples illustrated the third part forms a gasket for environmental sealing of the enclosure against a mount 70 (see FIG. 4).

In some examples, the physically integrated parts of the enclosure 10 include a further part of 'plateable' plastic. This is plastic that has an additive or catalyst that enables the plastic to be plated, for example with metal, after de-molding the enclosure 10. Some plating processes, for example electroless plating, will plate all exposed parts of the further part. Consequently, the shape of the metal components formed by plating can be controlled by controlling the shape of the exposed portions of the further part. In some examples, the plating of the further part can be performed using a laser. For example, metal can be produced by applying a laser beam to a metal-organic complex in a polymer matrix. The plated further part or parts may be used as a part of an antenna or as parts of antennas.

In some examples the ordering of the shots used to make the enclosure 10 can be changed. For example, the shot used to create the second part 30 could be before or after the shot used to create the first part.

In some examples mold inserts may be used to create voids.

Figure 4:
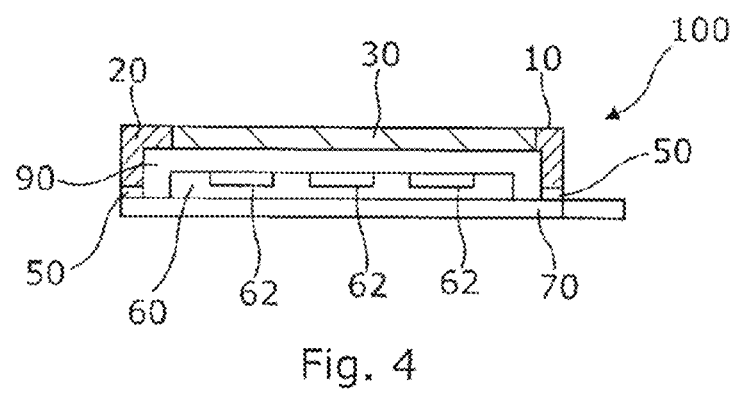
FIG. 4 shows another example embodiment of the subject matter described herein.

FIG. 4 illustrates an example of a system 100 comprising the enclosure 10 and an antenna arrangement 60 comprising one or more antenna radiators 62 that are adjacent to the second part 30 of the enclosure 10 but not adjacent the first part 20. The one or more antenna radiators 62 are closer to the second part 30 of the enclosure 10 than the first part 20. The main lobe of the radiation pattern formed, in use, by the antenna radiator(s) 62 passes through the second part 30 and not the first part 20 or passes predominantly through the second part 30 compared to the first part 20.

Figure 5A:
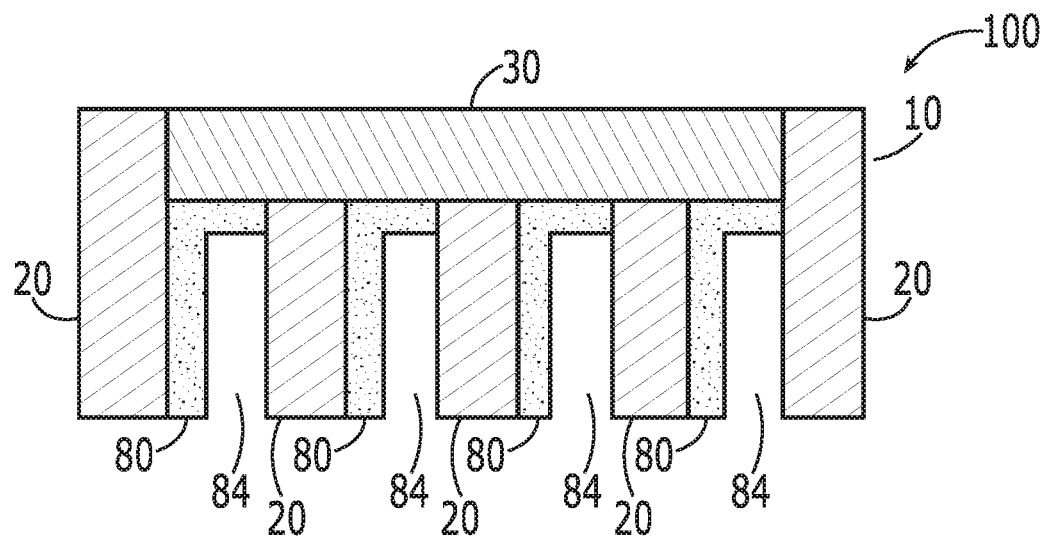
FIGS. 5A and 5B show another example embodiment of the subject matter described herein.
Figure 5B:
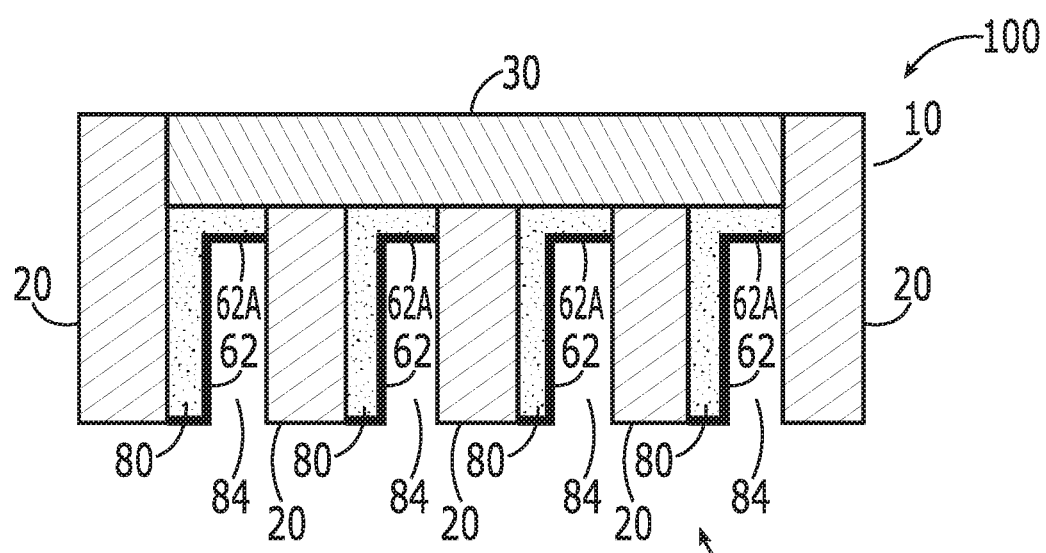

FIGS. 5A and 5B illustrate manufacture of an example of a system 100 comprising the enclosure 10 and an antenna arrangement 60. As illustrated in FIG. 5B, the antenna arrangement 60 comprises one or more antenna radiators 62 that have parts 62A that are adjacent to the second part 30 of the enclosure 10. Those parts 62A of the one or more antenna radiators 62 are closer to the second part 30 of the enclosure 10 than the portions of the first part 20 which form the outer surfaces of the enclosure 10. The main lobe of the radiation pattern formed, in use, by the antenna radiator(s) 62 passes through the second part 30 and not the first part 20 or passes predominantly through the second part 30 compared to the first part 20. In this example, the antenna radiators 62 are formed on further parts 80 of 'plateable' plastic. As previously described, this is plastic that has an additive or catalyst that enables the plastic to be plated, for example with metal, after de-molding the enclosure 10, to form the radiators 62. The shape of the metal components formed by plating can be controlled by controlling the shape of the exposed portions of the further part 80. In some examples mold inserts may be used to create voids, such as voids 84. The mold insert is placed before injection of the plastics that forms the further part 80. The mold insert excludes injected plastics from predefined volumes. The mold insert is then removed. A single molding cycle may be used to form parts 20, 30, 80. A portion of the plated plastic may provide a feed point and/or a ground point for one or more of the antenna radiator(s) 62 to provide electrical coupling to at least one of: radio frequency receiver circuitry, radio frequency transmitter circuitry and radio frequency transceiver circuitry.

In the systems 100 described above, the second part 30 has a lower dielectric permittivity and a lower dielectric loss compared to the first part 20. The second part 30 is more transparent than the first part 20 to electromagnetic radiation at the operational bandwidth(s) used by the antenna arrangement 60 housed within the cavity 90 of the enclosure 10. The further part 80 has a lower dielectric permittivity and a lower dielectric loss compared to the first part 20. The further part 80 is more transparent than the first part 20 to electromagnetic radiation at the operational bandwidth(s) used by the antenna arrangement 60 housed within the cavity 90 of the enclosure 10.

In these examples, the portion of the second part 30 that infills voids of the skeleton formed by the first part 20, is directly adjacent (immediately next to) the antenna radiators 62.

The enclosure 10 is a structural, weatherproof enclosure for an antenna arrangement 60 that conceals the antenna arrangement 60 from view without significantly compromising the operational efficiency of the antenna arrangement. In this example and other examples, the second part 30 forms a protective window for the antenna arrangement 60 that it is virtually transparent at the operational bandwidth(s) used by the antenna arrangement 60 housed within the cavity 90 of the enclosure 10 and is opaque at optical frequencies.

The system 100 in some examples is an antenna for a base transceiver station in a cellular telecommunications network. The system 100 in some other examples is an antenna for a portable or wearable electronic communications equipment.

Where a structural feature has been described, it may be replaced by means for performing one or more of the functions of the structural feature whether that function or those functions are explicitly or implicitly described.

The apparatus and system 100 may be part of the Internet of Things forming part of a larger, distributed network.

The antenna arrangement 60 may be configured to operate in one or a plurality of operational resonant frequency bands. For example, the operational frequency bands may include (but are not limited to) Long Term Evolution (LTE) (US) (734 to 746 MHz and 869 to 894 MHz), Long Term Evolution (LTE) (rest of the world) (791 to 821 MHz and 925 to 960 MHz), amplitude modulation (AM) radio (0.535-1.705 MHz); frequency modulation (FM) radio (76-108 MHz); Bluetooth (2400-2483.5 MHz); wireless local area network (WLAN) (2400-2483.5 MHz); hiper local area network (HiperLAN) (5150-5850 MHz); global positioning system (GPS) (1570.42-1580.42 MHz); US—Global system for mobile communications (US-GSM) 850 (824-894 MHz) and 1900 (1850-1990 MHz); European global system for mobile communications (EGSM) 900 (880-960 MHz) and 1800 (1710-1880 MHz); European wideband code division multiple access (EU-WCDMA) 900 (880-960 MHz); personal communications network (PCN/DCS) 1800 (1710-1880 MHz); US wideband code division multiple access (US-WCDMA) 1700 (transmit: 1710 to 1755 MHz, receive: 2110 to 2155 MHz) and 1900 (1850-1990 MHz); wideband code division multiple access (WCDMA) 2100 (transmit: 1920-1980 MHz, receive: 2110-2180 MHz); personal communications service (PCS) 1900 (1850-1990 MHz); time division synchronous code division multiple access (TD-SCDMA) (1900 MHz to 1920 MHz, 2010 MHz to 2025 MHz), ultra wideband (UWB) Lower (3100-4900 MHz); UWB Upper (6000-10600 MHz); digital video broadcasting—handheld (DVB-H) (470-702 MHz); DVB-HUS (1670-1675 MHz); digital radio mondiale (DRM) (0.15-30 MHz); worldwide interoperability for microwave access (WiMax) (2300-2400 MHz, 2305-2360 MHz, 2496-2690 MHz, 3300-3400 MHz, 3400-3800 MHz, 5250-5875 MHz); digital audio broadcasting (DAB) (174.928-239.2 MHz, 1452.96-1490.62 MHz); radio frequency identification low frequency (RFID LF) (0.125-0.134 MHz); radio frequency identification high frequency (RFID HF) (13.56-13.56 MHz); radio frequency identification ultra high frequency (RFID UHF) (433 MHz, 865-956 MHz, 2450 MHz).

An operational frequency band is a frequency band over which an antenna can efficiently operate. It is a frequency range where the antenna's return loss is less than an operational threshold.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; networks including cellular, non-cellular, and optical networks; ad-hoc networks; the internet; the internet of things.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

That which is claimed is:

1. An apparatus comprising an enclosure for an antenna arrangement comprising physically integrated parts, the enclosure comprising:
    a first part of first injection moldable plastic;
    a second part of second injection moldable plastic; and
    one or more further parts proximate the first and second parts and formed of plateable plastic comprising a plastic with an additive enabling the plastic to be plated with metal,
    wherein the first injection moldable plastic is more dense than the second injection moldable plastic, the first part and the second part are contiguous, the second part is more transparent than the first part to transmitted or received electromagnetic radiation at an operational bandwidth used by the antenna arrangement, such that an overall radiation efficiency of the antenna arrangement housed within a cavity is not compromised by the enclosure, the first part defines a skeleton having one or more voids, the second part infills at least some of the one or more voids of the skeleton, and the plateable plastic provides a feed point or a ground point for one or more antenna radiators to provide electrical coupling to at least one of: radio frequency receiver circuitry, radio frequency transmitter circuitry, or radio frequency transceiver circuitry.

2. The apparatus as claimed in claim 1, wherein the enclosure comprises one or more artefacts of multi-shot injection molding including one or more of: a molding line, a fill hole, or an ejector pin marking.

3. The apparatus as claimed in claim 1, wherein the first part and the second part are a physically integrated combination and are directly interconnected without adhesive.

4. The apparatus as claimed in claim 1, wherein the second part is a lower density cellular structure.

5. The apparatus as claimed in claim 4, wherein the lower density cellular structure comprises more gas than plastic by volume.

6. The apparatus as claimed in claim 1, wherein the second part has a lower dielectric permittivity and a lower dielectric loss compared to the first part.

7. The apparatus as claimed in claim 1, wherein the second part is formed from a polymer comprising gas and/or blowing agent.

8. The apparatus as claimed in claim 1, wherein the first part is rigid and configured to attach the enclosure to another object.

9. The apparatus as claimed in claim 1, wherein the physically integrated parts further comprise a third part, and wherein the third part comprises silicone rubber and forms a gasket for environmental sealing of the enclosure.

10. The apparatus as claimed in claim 1, wherein the first part is mechanically stronger than the second part.

11. A system comprising:
an enclosure comprising:
a first part of first injection moldable plastic;
a second part of second injection moldable plastic, wherein the first injection moldable plastic is more dense than the second injection moldable plastic, the first part and the second part are contiguous, the first part defines a skeleton having one or more voids, and the second part infills at least some of the one or more voids of the skeleton;
one or more further parts proximate the first and second parts and formed of plateable plastic comprising a plastic with an additive enabling the plastic to be plated with metal; and
an antenna arrangement comprising one or more antenna radiators closer to the second part of the enclosure than the first part, wherein the one or more antenna radiators are configured such that a main lobe of a radiation pattern formed thereby passes through the second part,
wherein the second part forms a protective window for the antenna arrangement and is more transparent than the first part to electromagnetic radiation at an operational bandwidth used by the antenna arrangement and is opaque at optical frequencies, and wherein the plateable plastic provides a feed point or a ground point for one or more of the one or more antenna radiators to provide electrical coupling to at least one of: radio frequency receiver circuitry, radio frequency transmitter circuitry, or radio frequency transceiver circuitry.

12. The system as claimed in claim 11, wherein the enclosure comprises one or more artefacts of multi-shot injection molding including one or more of: a molding line, a fill hole, or an ejector pin marking.

13. The system as claimed in claim 11, wherein the first part and the second part are a physically integrated combination and are directly interconnected without adhesive.

14. The system as claimed in claim 11, wherein the second part is a lower density cellular structure.

15. The system as claimed in claim 11, wherein the second part has a lower dielectric permittivity and a lower dielectric loss compared to the first part.

16. A method for manufacturing an enclosure for an antenna arrangement comprising multi-shot injection molding, the method comprising:
creating a first part of first injection moldable plastic with a first shot of the multi-shot injection molding;
creating a second part of second injection moldable plastic with a second shot of the multi-shot injection molding; and creating
one or more further parts proximate the first and second parts and formed of plateable plastic comprising a plastic with an additive enabling the plastic to be plated with metal,
wherein the first injection moldable plastic is more dense than the second injection moldable plastic, the first part and the second part are contiguous, the second part is more transparent than the first part to electromagnetic radiation at an operational bandwidth used by the antenna arrangement, the first part defines a skeleton having one or more voids, the second part infills at least some of the one or more voids of the skeleton, the first part has a higher Youngs Modulus than the second part, and the plateable plastic provides a feed point or a ground point for one or more antenna radiators to provide electrical coupling to at least one of: radio frequency receiver circuitry, radio frequency transmitter circuitry, or radio frequency transceiver circuitry.

17. The method as claimed in claim 16, wherein the second shot injects a polymer comprising gas and/or blowing agent to create, as the second part, a lower density cellular structure that comprises more gas than plastic by volume.

18. The method as claimed in claim 16, wherein both the first shot and the second shot are injected into a mold comprising a first portion and a second portion, wherein the first portion of the mold defines one or more volumes configured to receive the first shot and form the first part, and wherein the second portion of the mold and the first part define one or more volumes configured to receive the second shot and form the second part.

19. The method as claimed in claim 16, wherein a third shot creates a third part of silicone rubber.

* * * * *

UNITED STATES PATENT AND TRADEMARK OFFICE
CERTIFICATE OF CORRECTION

PATENT NO. : 12,218,418 B2
APPLICATION NO. : 16/723898
DATED : February 4, 2025
INVENTOR(S) : Mika Petri Päri It is certified that error appears in the above-identified patent and that said Letters Patent is hereby corrected as shown below:

In the Claims

In Column 10, Line 16, Claim 16, delete "creating" and insert the same at the Line 17, before "one or more", as a continuation sub point.

Signed and Sealed this
Third Day of June, 2025

Coke Morgan Stewart
*Acting Director of the United States Patent and Trademark Office*